United States Patent [19]

Tsubata et al.

[11] Patent Number: 4,960,350

[45] Date of Patent: * Oct. 2, 1990

[54] PROCESS OF STALLING THE SPEEDS OF ARTICLES TO BE CONVEYED IN A PNEUMATIC CONVEYING SYSTEM AND A DEVICE THEREFOR

[75] Inventors: Yukihiro Tsubata; Masaru Shiino, both of Minami-ashigara, Japan

[73] Assignee: Fuji Photo Film Co., Ltd., Kanagawa, Japan

[ * ] Notice: The portion of the term of this patent subsequent to Aug. 22, 2006 has been disclaimed.

[21] Appl. No.: 144,008

[22] Filed: Jan. 15, 1988

[30] Foreign Application Priority Data

Jan. 16, 1987 [JP] Japan .................................. 62-7518

[51] Int. Cl.⁵ .............................................. B65G 51/20
[52] U.S. Cl. ........................................ 406/84; 406/83
[58] Field of Search ................. 406/83, 84, 51, 151, 406/153; 285/236; 209/509, 651, 906, 911, 933

[56] References Cited

U.S. PATENT DOCUMENTS

| | | | |
|---|---|---|---|
| 3,748,177 | 7/1973 | Neumann et al. | 406/84 |
| 3,843,203 | 10/1974 | Golland et al. | 406/35 |
| 4,065,076 | 12/1977 | Alexandrov et al. | 406/84 |
| 4,264,239 | 4/1981 | Hoenisch | 406/83 |

Primary Examiner—Sherman Basinger
Assistant Examiner—Thomas J. Brahan
Attorney, Agent, or Firm—Sughrue, Mion, Zinn, Macpeak & Seas

[57] ABSTRACT

A process of stalling the speeds of articles to be conveyed in a pneumatic conveying system, wherein the speeds of the articles conveyed by conveying power wind through a transporting piping are stalled at a position close to the outlet of the transporting piping. According to this stalling process, air vents are formed at positions close to the outlet of the transporting piping, air having a wind flow rate higher than the wind flow rate of the conveying power wind is sucked through the air vents, whereby the speeds of the articles are stalled by counter flow wind flowing in through the outlet of the transporting piping.

6 Claims, 5 Drawing Sheets

PROCESS OF STALLING THE SPEEDS OF ARTICLES TO BE CONVEYED IN A PNEUMATIC CONVEYING SYSTEM AND A DEVICE THEREFOR

BACKGROUND OF THE INVENTION

1. Field of the Invention

This invention relates to a process of stalling the speeds of articles to be conveyed in a pneumatic conveying system and a device therefor, and more particularly to a process of stalling the speeds of articles to be conveyed in a pneumatic conveying system and a device therefor, wherein the articles thrown into a transporting piping are conveyed by conveying power wind flowing into the transporting piping.

2. Description of the Related Art

In general, when the articles are conveyed by a pneumatic conveying system through a transporting piping, the articles are discharged at high speed through the outlet of the transporting piping, whereby the articles, undergo great impact so that flaws wear and the like are caused to the articles.

To relieve the impact applied to the articles, there has heretofore been proposed a system as shown in FIG. 5 (Japanese Patent Kokai (Laid-open) No. 153718/1984). This device has a pneumatic tube 1 is formed therein with discharge holes 2 and communicating holes 3. These discharge holes 2 and communicating holes 3 are surrounded by a cover tube 4 and a working head 5, respectively. The cover tube 4 is provided with a fluid exhaust tube 6 having an electromagnetic valve 6A, and the working head 5 is provided with a fluid introducing tube 7 having an electromagnetic valve 7A for ON-OFF operating the flow of compressed air and with a connecting tube 8 branched from this fluid introducing tube 7 and having an exhaust valve 8A and a constant quantity sucking pump 8B. Incidentally, a capsule detecting tube 9 having a flow rate sensor 9A is provided on the tail end face of the pneumatic tube 1.

In this device, the articles are conveyed under pressure of compressed air by the pneumatic tube 1 toward the working head 5, while the electromagnetic valves 6A and 7A are opened to allow compressed air equal to the value of pressure of the conveying compressed air to flow from the electromagnetic valve 7A into the pneumatic tube 1 through the fluid introducing tube 7, the working head 5 and the communicating holes 3. The compressed air is discharged from the electromagnetic valve 6A through the cover tube 4. Pressures of the both compressed airs flowing in the two directions are brought into a balanced state at positions corresponding to the discharge holes 2, whereby the articles to be conveyed are stopped at these positions. Subsequently, when the electromagnetic valves 6A and 7A are closed and the pump 8B is operated to slowly exhaust the compressed air in the working head 5 through the exhaust valve 8A, the balance in the pneumatic tube 1 is lost, whereby the articles are slowly lowered.

In the above-described conventional device, capsules each incorporating therein a sample are made to be articles to be conveyed, these capsules are temporarily stopped at the positions corresponding to the discharge holes 2, and thereafter, slowly moved to the position of the working head 5, thus presenting such disadvantages that the device cannot be applied to the pneumatic conveying system wherein the articles to be conveyed are continuously thrown into the transporting piping for conveying in large quantities, and the device becomes complicated in construction.

SUMMARY OF THE INVENTION

The present invention has been developed to obviate the above-described disadvantages of the related art and has as its object the provision of a process of stalling the speeds of articles to be conveyed in a pneumatic conveying system wherein the articles are not damaged and the speeds of the articles can be satisfactorily stalled, and a device therefor.

To achieve the above-described object, the present invention contemplates the formation of at positions close to the outlet side of the transporting piping, conveying power wind for conveying the articles in the transporting piping and counter flow wind flowing in from the outlet side of the transporting piping are exhausted through the air vents, whereby the speeds of the articles are stalled by the counter flow wind in a conveying section from the air vents of the transporting piping to the outlet thereof.

More specifically, the articles being pneumatically conveyed at high speed in the transporting piping receive the counter flow wind in the conveying section from the air vents to the outlet, whereby the speeds of the articles to be conveyed are stalled by braking effects of this counter flow wind and discharged at low speed through the outlet of the transporting piping.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a pneumatic conveying system according to the present invention with reference to the accompanying drawings.

Figure 1:
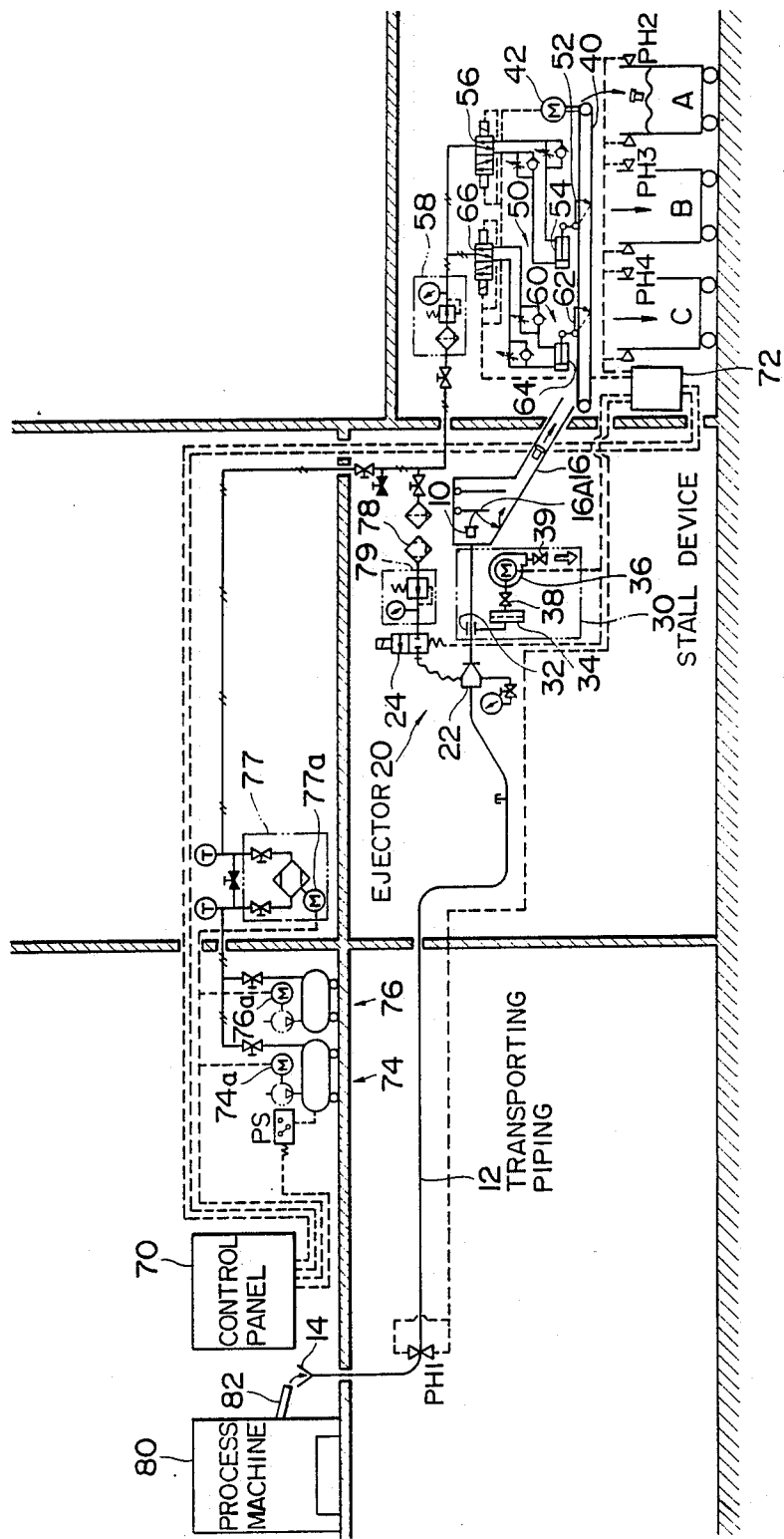
FIG. 1 is a diagram showing the general arrangement of the air conveying system used in this embodiment.

FIG. 1 is the block diagram generally showing one embodiment of the pneumatic conveying system according to the present invention. This pneumatic conveying system is adapted to convey cylindrical cases 10, in each of which a roll film magazine as being an article to be conveyed is housed, (hereinafter referred to as "P cases") from an assembling machine 80 to small silos A, B and C by combined use of pneumatic conveying and conveyor conveying.

The pneumatic conveying system is principally constituted by a transporting piping 12, an ejector 20, a stall device 30, a distributing conveyor 40, scrapers 50 and 60, a control panel 70, a manual operator control panel 72, and air pressure sources 74 and 76, etc.

Figure 3:
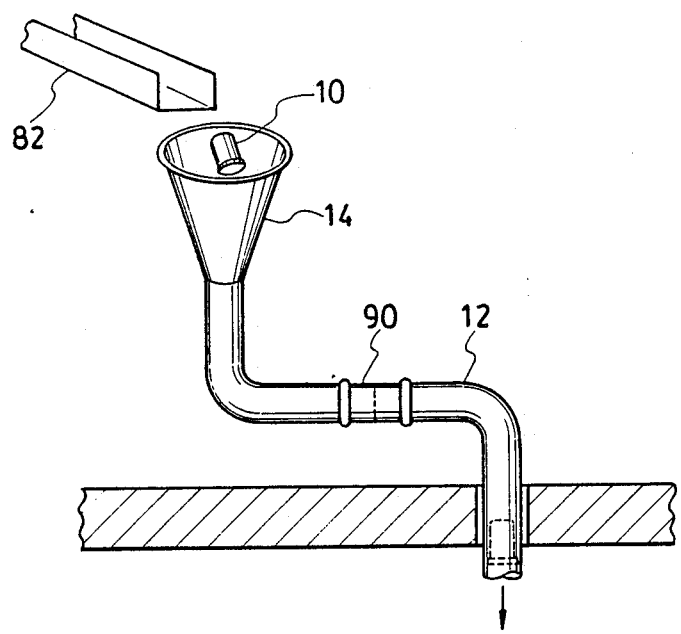
FIG. 3 is a schematic view showing the inlet side of the transporting piping shown in FIG. 1.
Figure 4:
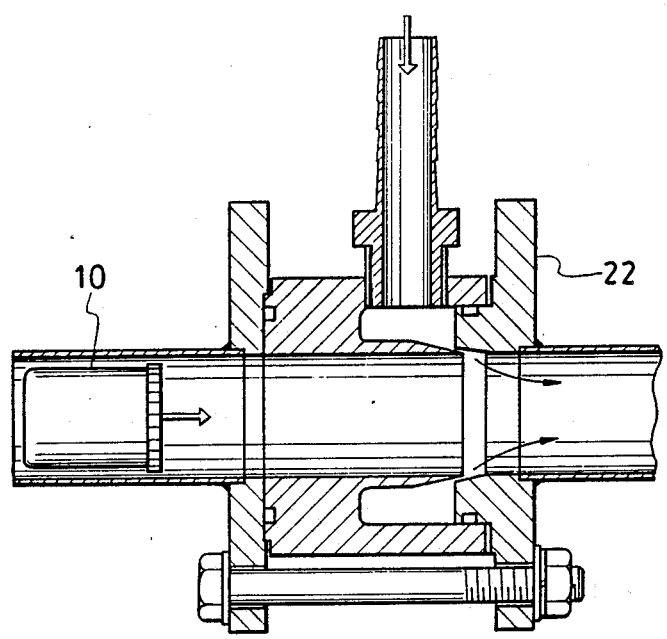
FIG. 4 is a sectional view showing an ejector nozzle in the ejector shown in FIG. 1.
Figure 5:
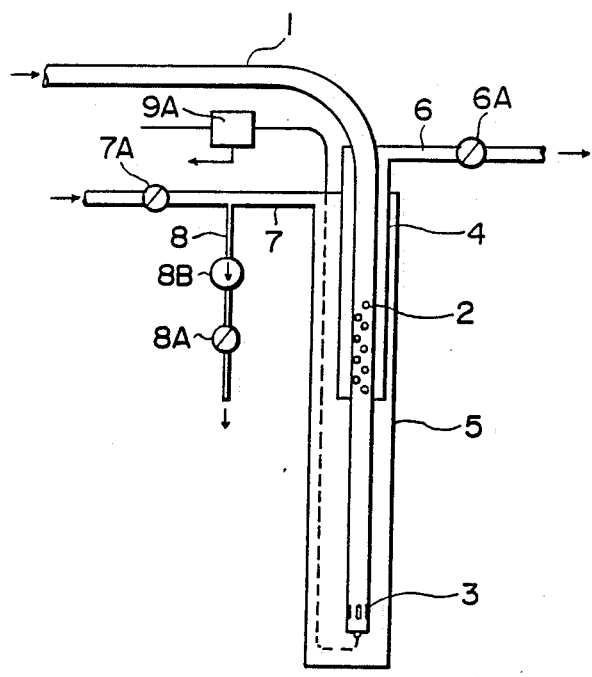
FIG. 5 shows an example of a conventional device for relieving impacts applied to the articles to be conveyed.

The transporting piping 12 is provided on the inlet side thereof with a conical receiving opening 14 for directly receiving the P cases 10 successively discharged from a shooter 82 of the assembling machine 80 (Refer to FIG. 3), and provided on the outlet side thereof with a shooter 16 for dropping the P cases 10 into the distributing conveyor 40. Incidentally, a curtain 16A is provided in this shooter 16 to absorb impacts of the P cases 10.

The ejector 20 is adapted to send out conveying wind power toward the outlet of the transporting piping 12, and is constituted by an ejector nozzle portion 22 (Refer to FIG. 3), an electromagnetic valve 24 and the like. Incidentally, air pressure of a desirable value is applied to the electromagnetic valve 24 from the air pressure source 74 or 76 through a dehumidifier 77, a mist separator 78 and an air regulator 79.

The stall device 30 is adapted to stall the speeds of the P cases 10 which are pneumatically conveyed, and is constituted by a suction portion 32 (Refer to FIG. 2) formed by providing a multiplicity of air vents 32A in the transporting piping 12, an exhaust fan 36 for sucking air from this suction portion 32 through a filter 34, and wind regulating valves 38 and 39 which are provided on the inlet and outlet sides of the exhaust fan 36, respectively.

The distributing conveyor 40 is adapted to convey the P cases 10, which are dropped from the shooter 16, and driven by a motor 42. Provided at suitable positions of this distributing conveyor 40 are scrapers 50 and 60 for dropping the P cases 10 on the distributing conveyor 40 into small silos B and C, which are located at conveying positions different from each other. The scraper 50 is constituted by a blade 52, an air cylinder 54 and an electromagnetic valve 56. Similarly, the scraper 60 is constituted by a blade 62, an air cylinder 64 and an electromagnetic valve 66. Additionally, air pressures are applied to the electromagnetic valves 56 and 66 from the air pressure sources 74 and 76, respectively, through a dehumidifier 77 and an air filter regulator 58. Furthermore, the distributing conveyor 40 is adapted to drop the P cases 10 into a small silo A when the blades 52 and 62 of the scrapers 50 and 60 are not operated.

The control panel 70 controls motors 74A, 76A of the air pressure sources 74, 76 and a motor 77A of the dehumidifier 77, and further controls the electromagnetic valve 24 of the ejector 20, the fan 36 of the stall device 30, the motor 42 of the distributing conveyor 40 and the electromagnetic valves 56, 66 of the scrapers 50, 60, etc. through a manual operator control panel 72. For example, the air pressure source 74 is controlled such that air pressure having a predetermined value preset by a pressure switch PS of the air pressure source 74 is discharged in response to a signal outputted from the pressure switch PS, and furthermore, the electromagnetic valve 24 of the ejector 20 is controlled (PDM—controlled for example), so that conveying wind power of a desirable value can be sent out.

Furthermore, a photo-sensor PH 1 is provided in the transporting piping 12, so that the number of the P cases 10 and the like can be controlled. Further, photo-sensors PH2, PH3 and PH4 are provided in the small silos A, B and C, respectively, so that the situations of storage of the P cases 10 in the small silos can be sensed. Incidentally, for example, detection signals of the photo-sensors PH2 to PH4 are used for controlling the scrapers 50, 60 and so on. More specifically, when it is detected that the small silo A is filled up with the P cases 10 by a signal from the photo-sensor PH2, the scraper 50 is brought into the operating condition, whereby the P cases are dropped into the small silo B. When it is detected that the small silo B is filled up with the P cases 10 by a signal from the photo-sensor PH3, thereupon, the scraper 60 is operated, whereby the P cases 10 are dropped into the small silo C. Additionally, the small silo filled up with the P cases 10 is replaced by a new one while the P cases 10 are dropped into another small silo.

The process of stalling the speeds of the articles to be conveyed in the pneumatic conveying system and the device therefore according to the present invention will hereunder be described in detail.

Figure 2:
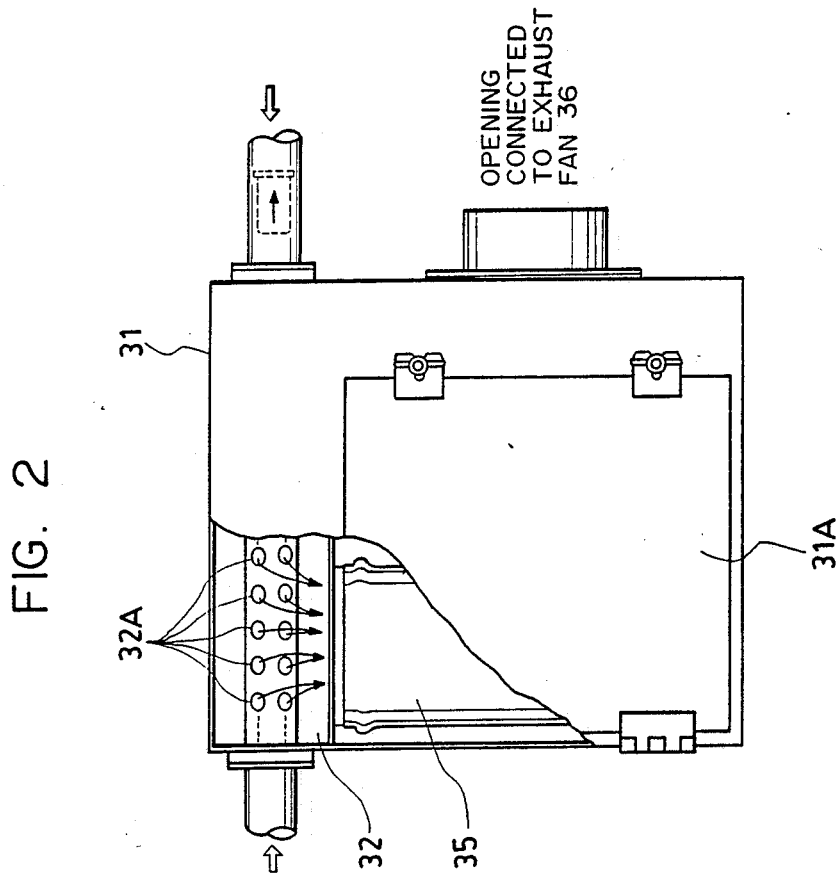
FIG. 2 is a partially broken away front view showing an embodiment of a chamber of a device for stalling the speeds of the articles to be conveyed in the pneumatic conveying system according to the present invention.

As shown in FIG. 2, this stall device 30 is constituted by the chamber 31 partially housing the transporting piping 12, the suction portion 32 formed by providing the multiplicity of air vents 32A around the transporting piping 12 housed in this chamber 31, the exhaust fan 36 for sucking air from this suction portion 32 through the filter 34, and the wind regulating valves 38 and 39, which are provided on the inlet and outlet sides of the exhaust fan 36, respectively.

The multiplicity of air vents 32A each are sufficiently large as not to hinder the conveying of the P cases 10, which are pneumatically conveyed through the transporting piping 12. Furthermore, the suction portion 32 formed therein with these air vents 32A are provided at a position spaced 600 mm apart from the outlet side of the transporting piping 12.

The filter 34 is provided in an air duct 35 extending from the suction portion 32 to the wind regulating valve 38, and adapted to absorb abraded powder of the P cases 10, dust and the like, to thereby dust the exhaust wind. Additionally, this filter 34 is replaceable through a door 31A provided on the chamber 31.

The exhaust fan 36 is adapted to suck air from the suction portion 32 through the filter 34 and exhaust the air and an exhaust air flow rate thereof can be regulated by the openings of the wind regulating valves 38 and 39, which are provided on the inlet and outlet sides thereof, respectively.

The principle of stalling the speeds by this stall device will hereunder be described. First, the exhaust fan 36 is driven such that the exhaust wind flow rate of the exhaust fan 36 becomes higher than the wind flow rate of the conveying power wind of the ejector 20 and atmosphere is allowed to flow through the outlet side of the transporting piping 12 toward the suction portion 32. This flow atmosphere (indicated by an arrow A) comes to be counter flow wind to the P cases 10, whereby this counter flow wind gives braking effects to the P cases 10 to stall the speeds thereof. Accordingly, the P case 10 has been in the maximally accelerated conditions at the outlet of the ejector 20. However, when the P case 10 passes through the suction portion 32 of the stall device 30, the P case 10 is stalled by the counter flow wind across the conveying section extending for 600 mm from this suction portion 32 to the outlet of the transporting piping 12, whereby the P case 10 is discharged into the shooter 16 in substantially natural dropping conditions.

Additionally, the ejector 20 is secured to the outlet side of the transporting piping 12 such that the P cases 10 do not block the transporting piping 12 and the conveying force is obtained by the suction system, so that the speeds of the P cases 10 reach the maximum at a position close to the outlet side of the transporting piping 12, and the speeds of the P cases 10 are stalled such that the impact forces applied to the P cases 10 are made satisfactorily low by the stall device 30 when the P cases 10 are discharged from the transporting piping 12. Incidentally, according to the experiments where 25 of the P cases 10 were continuously conveyed by use of this pneumatic conveying system, it was ascertained that, when the air pressure at the outlet of the ejector was 0.6 kg/cm$^2$, the speed of the P cases 10 became 5.2 m/sec, and, when the opening of the wind regulating valve 38 on the inlet side of the exhaust fan 35 of 0.4 kw was set to 50% and the opening of the wind regulating valve 39 on the outlet side was set to 80%, the P cases 10 did not block the pneumatic tube, but were reliably conveyed, and were discharged toward the shooter 16 in substantially natural dropping conditions at the time of being discharged.

Incidentally, in this embodiment, the counter flow wind is generated by the exhaust fan 36. However the present invention need not necessarily be limited to this, and any other ejector or the like may be provided to generate the counter flow wind.

As has been described hereinabove, the process of stalling the speeds of the articles to be conveyed in the pneumatic conveying system and the device therefor according to the present invention, using the counter flow wind flowing in through the outlet side of the transporting piping to give braking effects to the articles to be conveyed to stall the speeds of the articles, can make efficient stalling without damaging the articles.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A process for stalling the speeds of articles to be conveyed in a pneumatic conveying system, wherein said articles are roll film magazines conveyed one at a time by conveying power wind through a transporting piping are stalled at a position close to the outlet of said transporting piping, said process comprising the following steps:

forming air vents at positions close to the outlet side of said transporting piping and said conveying power wind for conveying said articles in said transporting piping;

providing a counter flow wind from the outlet side of the transporting piping in a direction opposite to a direction in which said conveying power wind flows; and exhausting said conveying power wind and said counter flow wind through said air vents, wherein the outlet of said transportation piping extends sufficiently far from said air vents to provide said counter flow wind, whereby the speeds of said articles are stalled by said counter flow wind in a section between said air vents and the outlet of said transporting piping.

2. The process of stalling the speeds of articles to be conveyed as set forth in claim 1, wherein the step of providing said counter flow wind comprises the step of sucking wind at a wind flow rate higher than the wind flow rate of said conveying power wind through said air vents.

3. The process of stalling the speeds of articles to be conveyed in a pneumatic system as set forth in claim 1, wherein said stalling is determined in accordance with a size of a section of said transporting piping in which the speeds of said articles are stalled and with the wind flow rate to be exhausted through said air vents.

4. A stall device for stalling the speeds of articles to be conveyed in a pneumatic conveying system, wherein the speeds of said articles conveyed by conveying power wind through a transporting piping are stalled at a position close to the outlet of said transporting piping, said stall device comprising:

sucking means for sucking wind at a wind flow rate higher than the wind flow rate of said conveying power wind through air vents formed at positions close to the outlet side of said transporting piping and sufficiently far from the outlet of said transporting piping to provide a counter flow wind; and means for providing a counter flow wind flowing in through the outlet side of said transporting piping in a direction opposite to a direction of said conveying power wind, to stall the speeds of said articles at a section between said air vents and the outlet of said transporting piping, wherein said articles are roll film magazines which are conveyed one at a time.

5. The stall device for stalling the speeds of articles to be conveyed in a pneumatic conveying system as set forth in claim 4, wherein said transporting piping has a multiplicity of said air vents formed in a peripheral surface thereof over a given length.

6. The stall device for stalling the speeds of articles to be conveyed in a pneumatic conveying system as set forth in claim 4, wherein said sucking means comprises: a suction portion surrounding said air vents; an exhaust fan; an air duct for connecting said suction portion and said exhaust fan to each other; and a filter provided in said air duct.

* * * * *